May 5, 1970     A. F. LEATHERMAN     3,510,619

APPARATUS FOR INDUCTION HEATING

Filed Oct. 18, 1965

INVENTOR
A.F. LEATHERMAN

By Lieber & Niller
ATTORNEYS

United States Patent Office 3,510,619
Patented May 5, 1970

3,510,619
APPARATUS FOR INDUCTION HEATING
Alfred F. Leatherman, Columbus, Ohio, assignor, by mesne assignments, to William C. Heller, Jr.
Filed Oct. 18, 1965, Ser. No. 497,381
Int. Cl. B23k 13/02; H05b 9/02
U.S. Cl. 219—10.53
5 Claims

ABSTRACT OF THE DISCLOSURE

A low inductance induction heating opparatus for providing a localized high frequency magnetic field includes a central current carrying bar and an outer current carrying plate partially surrounding the bar. When energized, a localized high frequency field is produced by the apparatus along the exposed portion of the bar which is useful in thermal processes such as the induction heat sealing of plastics.

---

This invention relates to induction heating apparatus and, more particularly, to an apparatus providing superior operating efficiencies.

Induction heating is a thermal process in which, in its well known forms, electrical energy in the form of a high intensity, high frequency magnetic field is applied to a metallic substance. The field induces eddy currents, or hysteresis losses, which cause heat to be generated in the substances itself. This method has been in common use for melting and heat treating metals for a number of years.

Induction heating may also be used in the thermal processing of non-metallic materials, such as plastics, by placing inductively heatable substances, as for example certain metal or metal oxide structures or particles, at points in the material where heat is desired, and then placing the composite structure in an alternating magnetic field. For example, if it is desired to join two sheets of plastic such as polyethylene, fine metal or metal oxide particles, or a metallic screen, may be placed between the sheets at the points desired to be joined. When a magnetic field is applied to the sheets, the particles or screen become heated, softening the plastic and allowing the two sheets to fuse. The metallic particles or structure is generally termed a "susceptor" to indicate its capability of being heated by a magnetic field.

The above method of thermal processing differs from dielectric thermal processing in which a non-metallic substance is itself heated by a high frequency electric field. Dielectric thermal processing involves considerations not here pertinent.

The advantages of induction thermal processing include the fact that heat is generated within the material itself at the location where it is to be used, thereby providing ideal temperature distributions and permitting accurate and beneficial control of temperature. Additionally, since heat is not required to flow from an external source through the material to the desired location, substantial increases in the rate of thermal processing are obtainable. The accurate temperature control and shortened exposure times prevent thermal damage, such as charring, warping, or distortion from occurring during the processing.

It is necessary, in order to obtain the above advantages in a commercially and technically feasible process, such as the heat sealing of plastics, to provide an induction heating apparatus capable of producing a magnetic force, or field, of the highest possible intensity and of the highest possible frequency in order to generate the largest amount of heat by induction losses. The equipment used to generate such a field generally consists of a field producing apparatus (e.g., "work coil") coupled to a high frequency power source. The attainment of both the aforementioned criteria depends to a great extent upon reducing inductance of this apparatus to the lowest possible value.

An excessive amount of inductance in the apparatus limits the magnitude of the high frequency current flowing through the apparatus and hence the intensity of the magnetic field generated thereby. While a greater applied voltage may be used to increase current flow, this may result in inefficient operation of the field producing apparatus. The size of the field producing apparatus may also be reduced to lower the inductance but often only at the expense of a decrease in processing speed or capacity of the equipment.

Further, it is generally desirable to operate the apparatus in parallel resonance with the power source, as current flow at such a frequency is maximized. Resonant frequency is determined by the formula $$f_R = \frac{1}{2\pi\sqrt{LC}}$$

A low value of inductance permits the resonant frequency of the apparatus to be high enough to generate induction losses of the required magnitude. For example, a resonant frequency of 4 megacycles may be required in thermal processing non-metallic materials. This is significantly above the frequencies required for metallurgical uses which generally range from 3 kilocycles to 450 kilocycles.

It is also desirable to direct or channel the magnetic field of the apparatus so as to concentrate or localize as much of it as possible in the material being thermally processed. Flux not so utilized performs no useful function and unless cancelled out or reduced increases the inductance of the apparatus unnecessarily.

It is, therefore, an object of this invention to provide an induction heating apparatus having a minimal value of inductance which utilizes such low inductance characteristics to produce a localized high frequency magnetic field suitable for efficient induction heating.

Another object of this invention is to provide a low inductance induction heating apparatus which provides a localized, high frequency magnetic field without the requirement of a large applied voltage.

A further object of this invention is to provide an induction heating apparatus which retains its low inductance characteristics even though it may be physically large in size.

Yet another object of this invention is to provide an induction heating apparatus which produces an external localized magnetic field where such field is needed to perform a useful thermal processing function, thereby maintaining the low inductance of the apparatus while providing efficient induction heating.

Yet another object of this invention is to provide an induction heating apparatus which is simple in construction and manufacture, thereby providing substantially troublefree operation for substantial periods of time.

The present invention provides an induction heating apparatus of low inductance by arranging the current carrying, flux generating portions thereof in a partially coaxial relationship. Specifically, a central current carrying portion is surrounded for part of its circumference by an outer portion carrying the return current. Current flow through the inner conductor generates an encircling magnetic field. Current flow in the opposite direction through the return conductor in effect generates an encircling magnetic field of opposite polarity which tends to cancel a large portion of the external magnetic field of the device which would otherwise cause a larger inductance. Where the two current carrying portions are not coaxial the external magnetic field is not cancelled, resulting in a localized magnetic field which may be used for induction thermal processing, as by heating a susceptor placed between adjacent portions of a nonmetallic material.

The manner in which this is accomplished, together with other features of the invention, may be better understood by reference to the following specification and drawings, forming a part thereof, in which.

Figure 1:
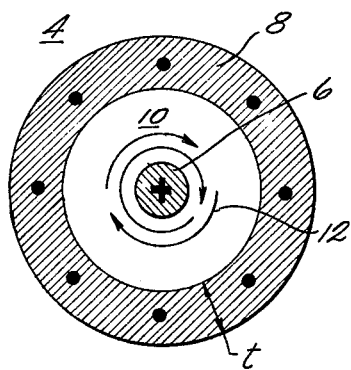
FIG. 1 is a diagrammatic view of a fully coaxial current carrying conductor.

As an understanding of the principles of coaxial conductors is necessary for an appreciation of the apparatus of the present invention, reference is initially made to FIG. 1 showing a coaxial conductor 4 having a central current carrying portion 6 and an outer, cylindrical, current carrying portion 8 of thickness $t$. An annular space 10 exists between central portion 6 and outer portion 8. For purposes of analysis, the central portion 6 may be assumed to be carrying current into the plane of the drawing, as indicated by the conventional symbol showing the tail of the current arrow, while the outer portion 8 returns the current out of the plane of the paper towards the viewer, as indicated by the conventional symbol showing the point of the current arrow. In accordance with electromagnetic principles, the current flow through portion 6 generates a magnetic field 12 encircling that portion in the manner indicated by the arrow. The return current in the outer portion 8 generates no magnetic field due to cancellation by magnetic field 12. The several widely recognized advantages of coaxial conductors result from the fact that essentially no magnetic field exists outside the device.

While the completely coaxial conductor 4 expresses the low inductance characteristics desired in an induction heating apparatus, it is totally unsuited for such a purpose because essentially no magnetic field exists around the outside of outer portion 8.

Figure 2:
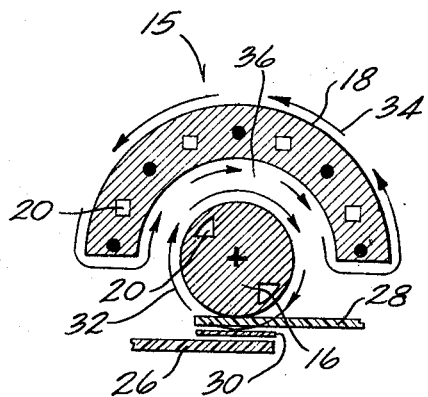
FIG. 2 is a cross sectional view of an induction heating apparatus of the present invention.

FIG. 2 shows an induction heating apparatus 15 according to the present invention employing the aforementioned principles of coaxial conductors to reduce the inductance thereof while also providing a localized external magnetic field suitable for induction thermal processing.

Specifically, the apparatus includes a central current carrying portion 16 and an outer, return, current carrying portion 18. Outer portion 18 only partially surrounds central portion 16. For example, outer portion 18 may extend around central portion 16 for approximately one-half the circumference of the latter. Both central current carrying portion 16 and outer portion 18 may be constructed from a good electrical and thermal conductor, such as copper, which may contain coolant passages 20 through which a liquid coolant may be circulated. The current carrying portions of apparatus 15 may be cooled by convection or conduction if desired.

Space 36 between central portion 16 and outer portion 18 may be left open to allow cooling air to circulate therethrough or may be filled with a non-magnetic electrically insulating substance to add rigidity and structural strength to induction heating apparatus 15.

Figure 3:
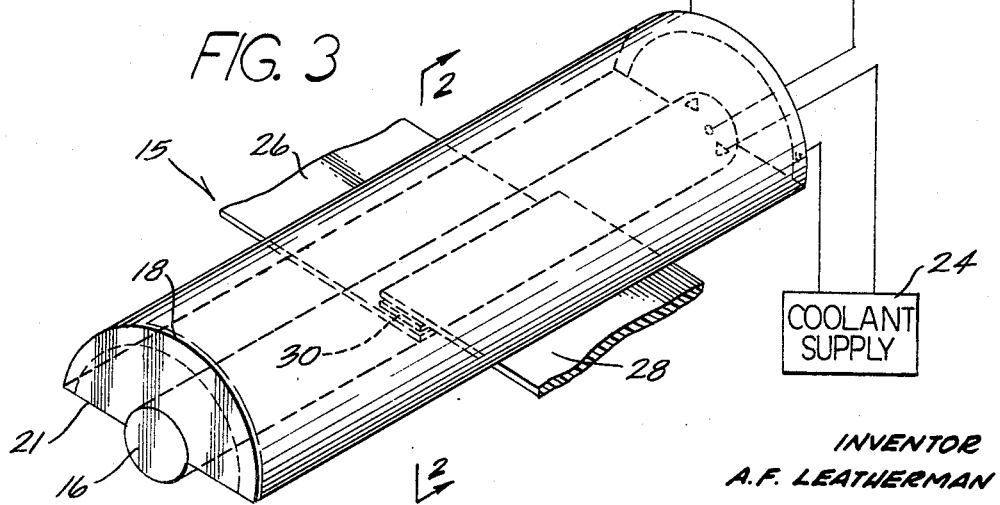
FIG. 3 is a perspective view of the induction heating apparatus illustrating its use in an induction heating process.

Portions 16 and 18 are electrically connected at one end to high frequency source 22, as shown in FIG. 3 and are electrically joined at the other end by conductor 21. High frequency source 22 supplies high frequency alternating current to portions 16 and 18. For example, the output frequency of high frequency source 22 may be four megacycles. Coolant supply 24 is connected to coolant passages 20 to circulate a coolant through portions 16 and 18.

In operation, high frequency source 22 provides high frequency current to portions 16 and 18. For purposes of analysis, such current flow is shown instantaneously in FIG. 2 as proceeding down central portion 16 into the plane of the paper and returning through portion 18 out of the plane of the paper. A magnetic field 32 is generated by the current flowing through central portion 16, the direction of which is shown by the arrows. Similarly, an oppositely directed magnetic field 34 is generated by the current flowing in the opposite direction through outer portion 18, which, in this case will have an external component. Because most of the external component of field 34 of outer portion 18 is cancelled by the opposite direction of the two magnetic fields 32 and 34, the inductance of apparatus 15 is small.

The magnetic field around the lower circumference of portion 16 is not so eliminated, however, and remains localized about the lower circumference of portion 16 to inductively heat a responsive substance placed in the field.

When the current from high frequency source 22 reverses, the direction of magnetic fields 32 and 34 also reverse. The part of magnetic field 32 around the lower circumference of central portion 16 reverses in its polarity to continue to provide a high frequency magnetic field necessary for induction thermal processing.

FIGS. 2 and 3 show the use of the above described heating apparatus 15 to join plastic sheets 26 and 28 by means of a layer of iron oxide particles 30 capable of being inductively heated by the magnetic field produced by the apparatus. Sheets 26 and 28 are arranged in an overlapping configuration with the layer 30 between the overlapping portions. The sheets are then placed adjacent the lower circumference of central portion 16, and within the magnetic field 32 surrounding this circumferential segment of portion 16. Magnetic field 32 inductively heats the particles of layer 30 to soften the overlapping edges of plastic sheets 26 and 28 to form a bond between them. When the plastic sheets have been sufficiently softened, high frequency source 22 may be turned off allowing the coolant in passage 20 to solidify the heat seal.

While the present invention has been shown and described with central portion 16 and outer surrounding portion 18 of circular configuration, the invention is not to be understood to be limited solely to elements of this shape. The current carrying portions may be triangular, rectangular, or any other desired shape.

Other modifications and alterations to the above invention are contemplated and it is desired to include all such modifications and alterations as come within the true spirit and scope of the claims below.

I claim:

1. A low inductance induction heating apparatus for providing a localized high frequency magnetic field from a high frequency power source for the induction thermoprocessing of materials comprising:

an elongated current carrying bar having a pair of spaced terminal portions separated by a peripheral surface, one of said terminal portions being connected to said power source, and an elongated current carrying plate spaced from and partially surrounding said bar along its peripheral surface, said elongated plate having a pair of spaced terminal portions, one of which is connected to said power source, the other terminal portions of both said bar and plate being connected together by a current conductor means;

whereby when said apparatus is energized by said high frequency power source, oppositely flowing currents pass through said bar and plate to create a localized, high frequency magnetic field along the exposed portion of the peripheral surface of said bar.

2. The low inductance induction heating apparatus of claim 1 wherein said bar is cylindrical and said plate is semi-circular along a cross section normal to the axes of said bar and plate.

3. The low inductance heating apparatus of claim 2, wherein said plate surrounds said bar for one-half of the peripheral surface of the latter and is uniformly spaced therefrom.

4. The low inductance heating apparatus of claim 1, wherein said current conductors are constructed of copper.

5. The low inductance induction heating apparatus of claim 1, wherein said current conductors contain coolant passages.

References Cited

UNITED STATES PATENTS

| | | | |
|---|---|---|---|
| 2,393,541 | 1/1946 | Kohler | 156—272 |
| 2,475,348 | 7/1949 | Black | 219—10.53 |
| 2,801,316 | 7/1957 | Hughes | 219—10.53 |
| 2,879,396 | 3/1959 | McDonald | 219—10.53 |
| 3,396,258 | 8/1968 | Leatherman | 219—10.53 |

JOSEPH V. TRUHE, Primary Examiner

L. H. BENDER, Assistant Examiner

U.S. Cl. X.R.

219—10.79